US011772580B2

(12) United States Patent
Pretorius

(10) Patent No.: US 11,772,580 B2
(45) Date of Patent: Oct. 3, 2023

(54) LICENSE PLATE FOR A VEHICLE

(71) Applicant: Tönnjes ISI Patent Holding GmbH, Delmenhorst (DE)

(72) Inventor: Albertus Jacobus Pretorius, Karalee (AU)

(73) Assignee: Tönnjes ISI Patent Holding GmbH, Delmenhorst (DE)

( * ) Notice: Subject to any disclaimer, the term of this patent is extended or adjusted under 35 U.S.C. 154(b) by 204 days.

(21) Appl. No.: 17/279,147

(22) PCT Filed: Sep. 18, 2019

(86) PCT No.: PCT/EP2019/075066
§ 371 (c)(1),
(2) Date: Mar. 24, 2021

(87) PCT Pub. No.: WO2020/064473
PCT Pub. Date: Apr. 2, 2020

(65) Prior Publication Data
US 2021/0387582 A1 Dec. 16, 2021

(30) Foreign Application Priority Data
Sep. 28, 2018 (DE) .......................... 102018007679.3

(51) Int. Cl.
*B60R 13/10* (2006.01)
*G06K 19/077* (2006.01)
(Continued)

(52) U.S. Cl.
CPC ........ *B60R 13/105* (2013.01); *G06K 19/0776* (2013.01); *G06K 19/07773* (2013.01);
(Continued)

(58) Field of Classification Search
CPC . G09F 2007/1865; G09F 7/18; H01Q 21/064; H01Q 1/3283; H01Q 1/3233; G06K 19/07773; G06K 19/0776; B60R 13/105
See application file for complete search history.

(56) References Cited

U.S. PATENT DOCUMENTS 3,895,987 A * 7/1975 Loreck .................... B60R 13/10
40/208
5,608,391 A 3/1997 Bantli
(Continued)

FOREIGN PATENT DOCUMENTS

CN 103661151 B 3/2017
CN 206551974 U 10/2017
(Continued)

OTHER PUBLICATIONS

WIPO, International Search Report (on priority application), dated Dec. 3, 2019.
(Continued)

*Primary Examiner* — David R Dunn
*Assistant Examiner* — Christopher E Veraa
(74) *Attorney, Agent, or Firm* — Laurence P. Colton; SMITH TEMPEL BLAHA LLC

(57) ABSTRACT

Licence plates with a data medium and a slot antenna have low transmission and reception performance for electromagnetic waves as a rule. Moreover, the positioning of the slot antenna is severely limited by an inscription on the licence plate. The invention provides a licence plate with a data medium and an antenna with improved transmission power and at the same time sufficient space for the positioning of the antenna. This is achieved by a licence plate body of the licence plate having at least one cavity, and a front of the
(Continued)

licence plate body or a coating of the front of the licence plate body covering the cavity comprises a slot structure forming the antenna.

19 Claims, 6 Drawing Sheets

(51) Int. Cl.
  *G09F 7/18* (2006.01)
  *H01Q 1/32* (2006.01)
  *H01Q 21/06* (2006.01)
(52) U.S. Cl.
  CPC ............ *G09F 7/18* (2013.01); *H01Q 1/3233* (2013.01); *H01Q 1/3283* (2013.01); *H01Q 21/064* (2013.01); *G09F 2007/1865* (2013.01)

(56) References Cited

U.S. PATENT DOCUMENTS

| | | | |
|---|---|---|---|
| 5,621,571 A * | 4/1997 | Bantli | B60R 13/10 359/530 |
| 7,922,094 B2 * | 4/2011 | Banerjee | G06K 19/07749 340/928 |
| 8,737,915 B2 | 5/2014 | Beenken | |
| 2007/0171077 A1 | 7/2007 | Kawarizadeh | |
| 2008/0042848 A1 * | 2/2008 | Roberts | B60R 13/10 340/572.7 |
| 2008/0258875 A1 * | 10/2008 | Jesme | G06K 19/07771 340/928 |
| 2009/0021379 A1 * | 1/2009 | Zhu | G06K 19/07758 340/572.8 |
| 2011/0258894 A1 * | 10/2011 | Beenken | G06K 19/07783 40/208 |
| 2014/0366411 A1 | 12/2014 | Sirosaki | |
| 2015/0170019 A1 * | 6/2015 | Beenken | G06K 19/0724 235/492 |
| 2016/0300131 A1 * | 10/2016 | Nyalamadugu | G06K 19/07773 |
| 2017/0274841 A1 | 9/2017 | Tonnjes | |
| 2021/0027553 A1 * | 1/2021 | Beenken | H04B 5/0081 |
| 2021/0316675 A1 * | 10/2021 | Beenken | G09F 3/0335 |

FOREIGN PATENT DOCUMENTS

| | | |
|---|---|---|
| DE | 102014012291 A1 | 2/2016 |
| DE | 102019002722 A1 | 10/2020 |
| WO | 2015183111 A1 | 12/2015 |

OTHER PUBLICATIONS

IP Australia, Examination Report No. 2 (on a related application), dated Jun. 17, 2020.
IP Australia, Examination Report No. 1 (on a related application), dated Feb. 25, 2020.
European Patent Office, Office Action (in a related non-US application), dated Apr. 19, 2022.

* cited by examiner

LICENSE PLATE FOR A VEHICLE

CROSS REFERENCE TO RELATED APPLICATIONS

This application is the US National Phase of and claims the benefit of and priority on International Application No. PCT/EP2019/075066 having an international filing date of 18 Sep. 2019, which claims priority on and the benefit of German Patent Application No. 10 2018 007 679.3 having a filing date of 28 Sep. 2018.

BACKGROUND OF THE INVENTION

Technical Field

The invention concerns a licence plate for a vehicle with a licence plate body comprising at least one inscription field and with at least one inscription associated with the inscription field of the licence plate body, wherein a contactlessly readable data medium and an antenna are associated with the licence plate body.

The licence plate according to the invention is a so-called number plate that can be fastened to a body or a bumper of a vehicle at the front and/or rear.

Prior Art

Licence plates of the type mentioned are often forged or used for other vehicles. In order to prevent this, licence plates are known that comprise a contactlessly readable data medium. This contains relevant data for the vehicle to which the licence plate belongs. Reading said data is carried out by means of an external reader. The comparison of the data that is read out with the vehicle on which the licence plate is used allows conclusions regarding manipulations, in particular if the licence plate is associated with another vehicle.

With known licence plates, the data media are coupled to a slot antenna. Said slot antenna then allows the data medium to be read over a longer distance. In this case, the slot structure of the antenna is incorporated in the metallic licence plate body of the licence plate or in a metallised layer of the licence plate. Due to the positioning of the slot antenna on the licence plate body, the positioning of the conventional inscription on the licence plate with letters and/or numbers or similar is limited. Likewise, because of the necessary inscription on the licence plate, the slot can only be attached at a few positions on the licence plate body.

A further disadvantage of the known licence plate with a slot antenna is that the transmission power of the antenna is limited. Because the radiation characteristic or the dipole characteristic of the slot antenna is at least substantially symmetrical, one part of the emitted electromagnetic waves is radiated away from the vehicle and another part towards the vehicle. The result of this is that at least half of the transmission power is absorbed by the licence plate holder or by the vehicle itself and only a fraction of the total transmission power is radiated towards a potential receiver.

BRIEF SUMMARY OF THE INVENTION

It is the object of the invention to provide a licence plate with a data medium and an antenna that have improved transmission power and at the same time sufficient space for positioning an inscription.

A licence plate, in particular a vehicle licence plate, for achieving this object comprises a licence plate body comprising at least one inscription field and with at least one inscription associated with the inscription field of the licence plate body, wherein a contactlessly readable data medium and an antenna are associated with the licence plate body, characterized in that at least one cavity is disposed in the licence plate body, wherein a front of the licence plate body or a coating of the front covering the cavity comprises a slot structure forming the antenna. Therefore, it is provided that the licence plate comprises a licence plate body with at least one inscription field. An inscription in the form of letters and/or numbers is associated with said inscription field. A first identification of the vehicle or the vehicle holder is carried out using this inscription. In addition, at least one contactlessly readable data medium with an antenna is associated with the licence plate body. Further information about the vehicle and/or about the vehicle holder can be stored on said data medium. The licence plate body of the licence plate forms at least one cavity, wherein a front of the licence plate body or a coating of the front of the licence plate body covering the cavity has a slot structure. According to the invention, said slot structure forms the antenna for the data medium. Due to the cavity in the interior of the licence plate body, the body is embodied as a flat hollow block. Due to this slot structure in conjunction with the cavity of the licence plate body, the radiation characteristic of the antenna or the slot antenna can be improved, so that the data stored on the data medium can be transported with greater transmission power.

In particular, the present invention can provide that the at least one cavity is formed by separating the front and rear of the licence plate body. The front or a cover part and the rear or a bottom part of the licence plate body enveloping the cavity are held together by a peripheral border. Said border can comprise both angular and rounded corners. The basic shape of both the rear and the front are preferably identical and as a rule rectangular. Due to said shape of the hollow licence plate body it has increased stability. The distance from the rear of the licence plate body to the front can be a few millimetres.

Preferably, a further exemplary embodiment of the present invention can provide that the front or the cover part, the rear or the bottom part and/or the border are manufactured from a transparent material, such as for example plastic. Both the front, the rear and the border can be coated from the outside and/or also from the inside at least in some areas with a metal coating. The slot structure is incorporated in said metal coating on the front of the licence plate body. Alternatively, it is also conceivable that the front, the rear and/or the border is/are made of metal. This can be aluminium for example. With the first-mentioned exemplary embodiment for example a plastic block can be provided with an external metal layer, in particular a vapour-deposited layer. Due to said metallisation or the metal, the slot structure for the antenna of the data medium can be produced in a simple way. In this case, almost any shape of the slot structure is conceivable.

A further exemplary embodiment of the invention can provide that the slot structure is embodied as a straight slot that is oriented parallel to a lateral edge of the front of the licence plate body. Likewise, it is conceivable that the slot structure is formed of a plurality of slots that are disposed in parallel or antiparallel with each other. A further particularly preferred exemplary embodiment can provide that the slot structure is embodied as a first slot, on the ends of which two preferably parallel short slots are disposed in each case, so that the slot structure forms an elongated "H". This structure for a slot antenna has particular advantageous properties related to the emission of electromagnetic waves and the absorption of electromagnetic waves.

A further advantageous embodiment of the present invention can provide that at least one, in particular a number of, preferably mutually parallel distance elements or structure elements are disposed in the cavity between the front and the rear. Due to said structure elements or distance elements or distance holders, the licence plate body can be further stabilised. The distance between the front and the rear can be defined or fixed by said elements. Unintentional compression of the licence plate body is thereby unlikely.

A particularly advantageous embodiment of the present invention can provide that the front and an inner side of the rear in the cavity opposite the slot structure is retroreflective, in particular being coated with a retroreflective layer, wherein the retroreflective area of the inner side is larger than the slot structure. Due to said retroreflective property of the inner side of the cavity, light that passes through the slot structure into the interior of the cavity is reflected back. Due to this reflection, the slot structure can only be detected with difficulty. In particular, when using an image acquisition device in conjunction with a flashlight the structure element is as good as invisible. Likewise, the electromagnetic waves radiated by the slot antenna or the inverse dipole antenna are reflected back at the metallised rear of the cavity and pass through the slot structure back out of the cavity.

Furthermore, according to the invention it can be provided that a retroreflective, in particular self-adhesive, layer or film is applied to the front of the licence plate body that comprises demetallisation or a slot-shaped aperture corresponding to the shape of the slot structure. Due to said applied layer, the slot structure can be formed in a simple way.

Preferably, it is moreover conceivable that the inscription, especially a self-adhesive layer or film preferably comprising the inscription, is applied to the front of the licence plate body, in particular to a retroreflective layer or a coating of the licence plate body. Owing to the hollow body or the likewise retroreflective rear of the cavity, the licence plate appears continuous when viewed from the front, as if the licence plate body would not have a slot structure. As a result, the slot structure can be applied to almost any point on the licence plate body, even under the inscription, and this without adversely affecting the legibility of the inscription. Because in particular the area of the slot structure is demetallised, the transmission or reception performance of the slot antenna is not affected by the film or the layer. The inscription is transparent to electromagnetic waves.

Finally, it can moreover be provided that the data medium is a magnetic field generating data medium, and in particular is inductively and/or capacitively coupled to the antenna, wherein the data medium is disposed on or in the licence plate body and is electrically isolated from the antenna. Moreover, it is also conceivable that the slot structure has a perforation, wherein the perforation preferably enlarges the slot in the vicinity of a closed end, and the data medium is disposed in the perforation.

For greater mechanical stability or safety, it can moreover be provided that the data medium is fixed in the slot structure or in the perforation, in particular being covered by a coating or potted.

In order to fasten the licence plate or the licence plate body to a vehicle, at least one mounting aid, in particular bores or other receptacles, can be associated with the rear of the licence plate body. By using said mounting aid, the licence plate body can be fastened to the vehicle in a simple and above all flexible way.

A further exemplary embodiment of the invention can provide that the slot structure can be positioned in a first or a second third on the front measured from a longitudinal side of the licence plate body. Due to this positioning on the licence plate body, on the other hand the inscription can be applied to the front of the licence plate body at the same time and this can be done without adversely affecting the legibility of the inscription and reducing the transmission power of the slot antenna.

BRIEF DESCRIPTION OF THE DRAWINGS

A preferred exemplary embodiment of the invention is described in detail below using the drawing. In the figures.

DETAILED DESCRIPTION OF PREFERRED EMBODIMENTS

Figure 1:
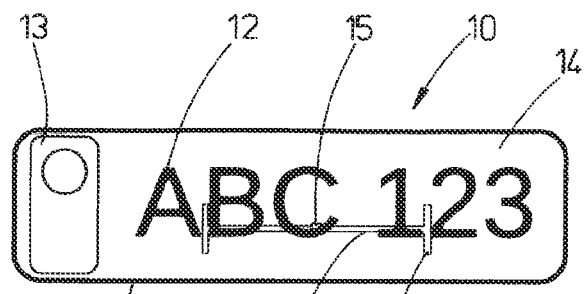
FIG. 1 shows a view of a licence plate with a slot antenna.

An example of a licence plate 10 according to the invention for a vehicle is represented in FIG. 1. Such licence plates 10 are also referred to as vehicle licence plates or number plates. As a rule, said licence plates 10 are fastened to a vehicle at the front and/or at the rear. It is however also conceivable that said licence plates 10 are fastened at other positions, such as for example on a windscreen or a driver's cab of the vehicle. Licence plates 10 of the type described here are used for identification of the vehicle and in some cases also of the holder of the vehicle. For this purpose, letters and/or numbers are disposed on the licence plate 10 or on a licence plate body 11 forming the licence plate 10. This inscription 12 can reproduce different information in encoded form. The arrangement or the information content of said inscription 12 can differ from country to country. Moreover, the exemplary embodiment of the licence plate 10 represented in FIG. 1 comprises a country identifier 13. With said country identifier 13 the vehicle can be provided with a country code that gives information about the country in which the vehicle is registered. Such a country identifier 13 is however not disposed on the licence plate 10 in all countries and should therefore not be limiting for the invention described here.

The licence plate 10 or the licence plate body 11 is embodied as an elongated rectangle as a rule. It is however also conceivable that said rectangle is compressed or forms a square. The inscription 12 is disposed on an inscription field 14 centred on the surface of said rectangle or on the licence plate body 11. Moreover, licence plates 10 are known that in addition to the inscription 12 comprise a data medium 15, on which further data or information about the vehicle and/or the vehicle holder are stored in electronic form. For a contactless readout of said data medium 15 or even for contactless writing to the data medium 15, an antenna 16 is associated therewith. With known licence plates 10, said antenna 16 is embodied as a slot antenna. Said slot antenna is formed by a recess in a metallic licence plate or a metallic layer. The antenna 16 or slot antenna is inductively or capacitively coupled to the data medium 15. In the case of the known licence plate 10 with a slot antenna, the slot antenna is disposed on the licence plate body 11 so that it does not overlap the inscription 12. In the case of the licence plate 10 according to the invention described here and represented in FIG. 1, the antenna 16 can be disposed at any location on the inscription field 14. It is thus also conceivable that the inscription 12 covers the antenna 16.

The slot structure 17 of the antenna 16 represented in FIG. 1 forms an elongated "H". It is however also conceivable that said slot structure 17 consists of a plurality of individual parallel slots, of a single slot or a plurality of contiguous slots that are disposed in parallel and/or orthogonally.

Figure 2:
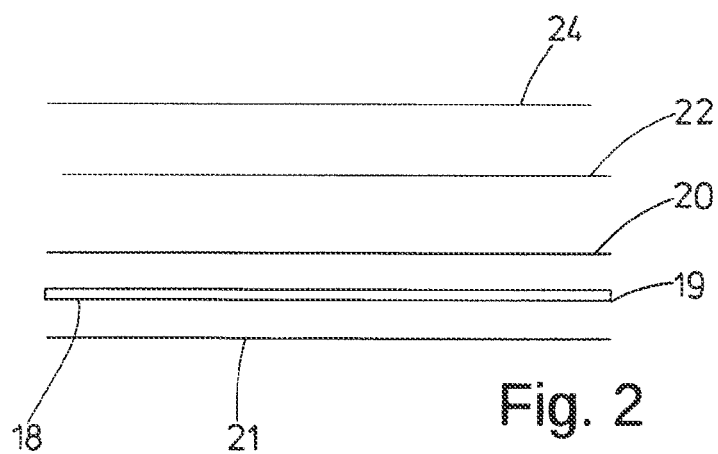
FIG. 2 shows an exploded representation of the licence plate according to FIG. 1.
Figure 3:
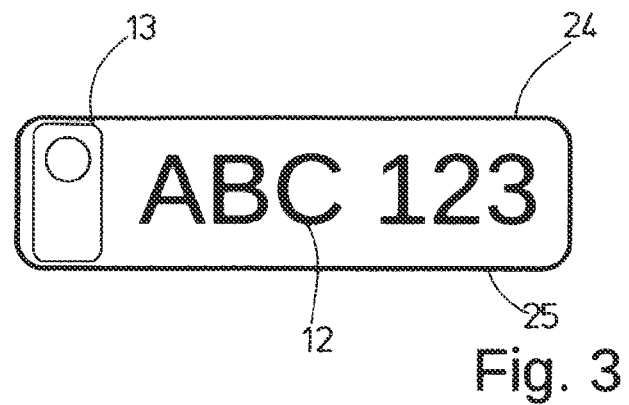
FIG. 3 shows a representation of a film with an inscription.

The licence plate 10 described here consists essentially of the licence plate body 11, which is embodied as a square and comprises a cavity 18 in the interior thereof. In FIG. 2 an exploded representation is formed for a representation of the licence plate 10, in which the individual layers from which the licence plate 10 is built up can be seen. The licence plate body 11 is composed of a border 19, a cover part 20 and a bottom part 21. Whereas the cover part 20 and the bottom part 21 are embodied in a plate form, the border 19 is a type of peripheral collar. The height of the border 19 or the collar is the thickness or height of the licence plate body 11. The base area of the cover part 20, the bottom part 21 and the border 19 are identical with the base area of the licence plate body 11 or the licence plate 10. To form the licence plate body 11, the cover part 20 is placed on the border 19 and the bottom part 21 parallel to the cover part 20 is likewise brought into contact with the border 19. Said three parts are then fixedly joined to each other, preferably glued. As a result, the cover part 20 with the bottom part 21 and the border 19 form a block forming the licence plate body 11 with the cavity 18. It is conceivable that the licence plate body 11 or the aforementioned individual parts are formed from plastic. Likewise, it is conceivable that the individual parts of the licence plate body 11 are metallic. A further exemplary embodiment can moreover provide that the licence plate body 11 is made up of a single contiguous part. For the case in which the licence plate body 11 or the cover part 20, the bottom part 21 and the border 19 is/are made of a plastic, according to the invention it can be provided that said parts are provided with a metallic coating from the outside or from the inside. Said metallic coating is embodied so as to form an electrical surface conductor. Due to said electrical conductivity of the surface, the licence plate body 11 acts reflectively, in particular for electromagnetic radiation at least in some spectral regions.

Figure 4:
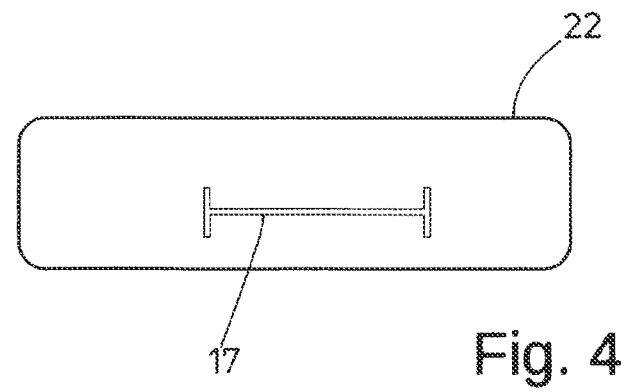
FIG. 4 shows a representation of a reflex film with a slot structure.
Figure 5:
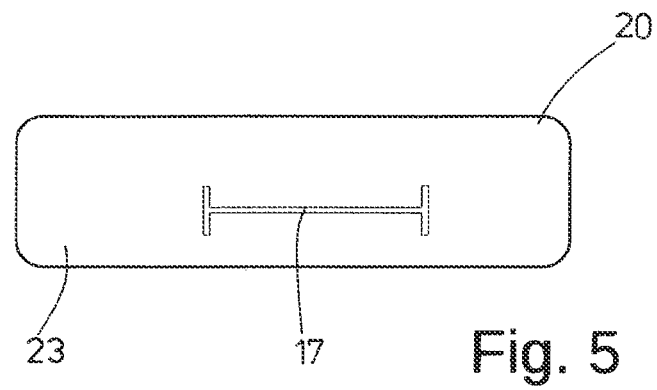
FIG. 5 shows a representation of a cover part of a licence plate body.

A reflex film 22 that may be metallised or a retro reflex film is adjacent to the cover part 20 of the licence plate body 11. Said reflex film 22 is preferably glued to the cover part 20. The reflex film 22 represented in FIG. 4 is identical or at least almost identical to the dimensions or the base area of the licence plate 10 by virtue of the dimensioning thereof. The slot structure 17 forming the antenna 16 is positioned centrally on the reflex film 22. Said slot structure 17 is a recess or a cut-out in the reflex film 22. In said area the reflex film 22 is not metallised. The cover part 20 is also demetallised in the area in which the slot structure 17 is disposed on the reflex film 22. This means either that, as represented in FIG. 5, the metallic coating 23 on the cover part 20 comprises an identical slot structure 17 that is aligned with the slot structure 17 of the reflex film 22 when assembling the reflex film 22 together with the cover part 20 or that the cover part 20 is completely demetallised, i.e., has no metallic coating 23.

Then an especially self-adhesive film 24 can be applied to the reflex film 22. Said film 24 is provided with the inscription 12. It is moreover conceivable that the film 24 is provided with the inscription 12 subsequently. Moreover, said film 24 can comprise the aforementioned country identifier 13. The film 24 is identical in the dimensioning thereof to the licence plate body 11 or the licence plate 10. Whereas the film 24 is embodied to be at least substantially transparent to visible light, the inscription 12 is opaque. This means that the inscription 12 covers the reflex film 22 and thus only incident light that is not incident on the inscription 12 is reflected from the reflex film 22. Moreover, further features can be printed on the film 24, such as for example a border 25. The film 24 can moreover be used to protect the data medium represented in FIG. 1, which is in at least electrical or electromagnetic contact with the slot structure 17, against manipulations or other environmental influences. The data medium 15 disposed on the reflex film 22 can be covered by the film 24. It is however also conceivable that the data medium 15 is disposed on the inside of the cover part 20 or on the top of the cover part 20.

Figure 6:
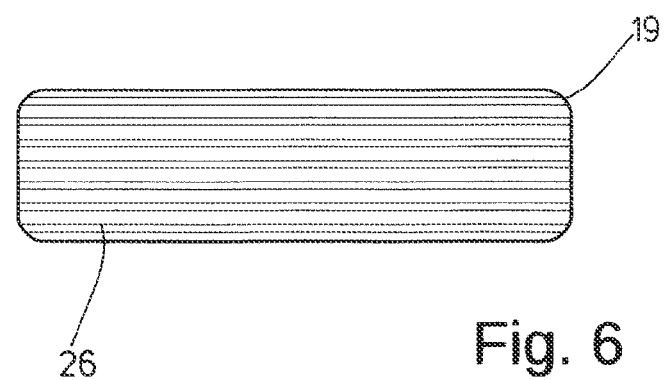
FIG. 6 shows a representation of a supporting structure.
Figure 7:
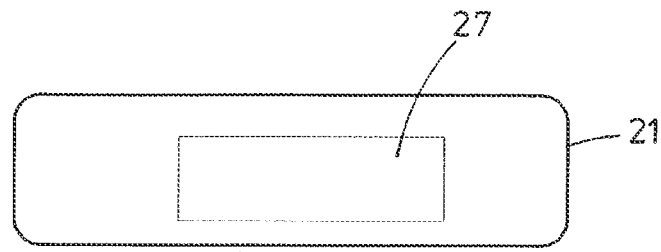
FIG. 7 shows a representation of a bottom part of the licence plate body.

For stabilising the licence plate 10 or the licence plate body 11, distance elements or structure elements 26 can be disposed in the cavity 18 of the licence plate body 11 (FIG. 6). Said structure elements 26 are made in a web-like form in the exemplary embodiment represented in FIG. 6 and are disposed parallel to each other within the border 19. The individual structure elements 26 can be in direct contact with the cover part 20 and the bottom part 21 of the licence plate body 11 in this case. Said structure elements 26 impart to the entire licence plate body 11 a certain stiffness that protects it against mechanical forces such as for example twisting or bending. In particular, for a licence plate body 11 of plastic the structure elements 26 contribute significantly to the stability of the licence plate 10. In this case, moreover, it can be provided that the structure elements 26 are also made of a plastic or a transparent plastic. The structure elements 26 can be disposed in the cavity 18 so as to coincide with the slot structure 17 or so that the slot structure 17 is not disposed over one or more of the structure elements 26.

The bottom part 21 comprises a retroreflective coating 27 on a side facing the slot structure 17. Said retroreflective coating 27 is dimensioned at least so as to correspond to or to be greater than the slot structure 17 in terms of the length and width of the slot structure 17 dimensions. Said coating 27 can also be a film or a retroreflective paint that is applied to the surface of the bottom part 21 when assembling the licence plate body 11.

Figure 8:
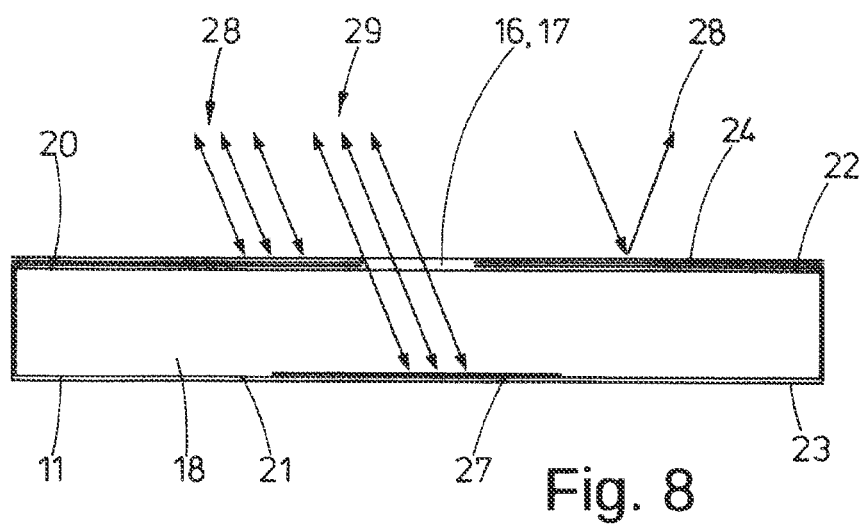
FIG. 8 shows a section through a licence plate according to FIG. 1.

In FIG. 8 a highly schematic section through the licence plate 10 or through the licence plate body 11 is represented with the cavity 18 and the metallic coating 23 of the licence plate body 11, the reflex film 22 and the film 24. In the vicinity of the slot structure 17 or the antenna 16, the metallic coating 23 and the reflex film 22 are interrupted. It is however also conceivable that the reflex film 22 is not interrupted. In particular, if the cover part 20 of the licence plate body 11 is not metal-coated, only the film 24, which is then metallised, comprises an aperture for the slot structure 17. The especially substantially transparent film 24 covers the entire top of the licence plate 10.

The slot structure 17 is applied to the bottom part 21 of the licence plate body 10 opposite the retroreflective coating 27. If light is now incident on the licence plate 10, the light is reflected or retroreflected at the reflex film 22 as represented schematically by the arrows 28. If the light rays are incident through the slot structure 17 into the cavity 18, they are also reflected or retroreflected by the retroreflective coating 27 according to the arrows 29. If for example an image recording is now made of the licence plate 10 using a flashlight, the slot structure 17 is only visible with difficulty or not at all, because the light that passes through the slot structure 17 is also reflected. Due to this arrangement of the retroreflective coating 27 on a side opposite the slot structure 17, the slot structure 17 can thus be arbitrarily positioned relative to the inscription 12 without adversely affecting the legibility or the visibility of the inscription 12 as a result. Because the retroreflective coating 27 dimensions exceed those of the slot structure 17, light rays passing through the slot structure 17 at an acute angle to the top of the licence plate 10 are retroflected.

A further advantage of the cuboid or hollow licence plate body 11 is that the electromagnetic waves emitted by the antenna 16 are reflected away from the vehicle by the metallised bottom part 21 in the direction of travel or against the direction of travel. On the one hand, the electromagnetic waves emitted by the slot structure 17 or antenna 16 radiate away from the vehicle. The electromagnetic waves that are initially emitted towards the vehicle are reflected back by the metallic coating 23 of the bottom part 21 and exit through the slot structure 17, therefore the transmission power of the antenna 16 is boosted. Likewise, the reception performance of the antenna 16 can also be increased by this design of the licence plate body 11. Due to said increase in the transmission power, the data medium can also be read over a greater distance or a greater range of spatial angles without problems. This has proved particularly advantageous for use in road traffic.

Figure 9:
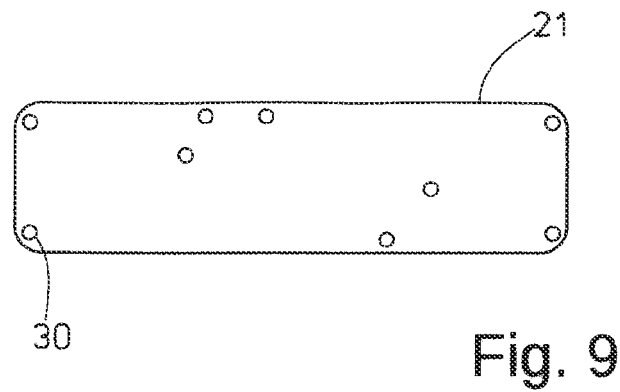
FIG. 9 shows a representation of the rear of the licence plate.
Figure 10:
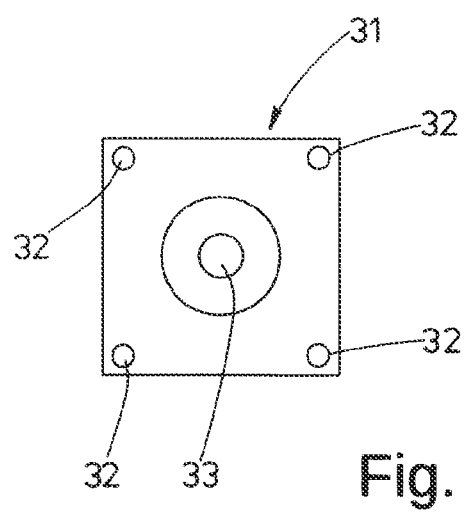
FIG. 10 shows a view of a connecting means.
Figure 11:
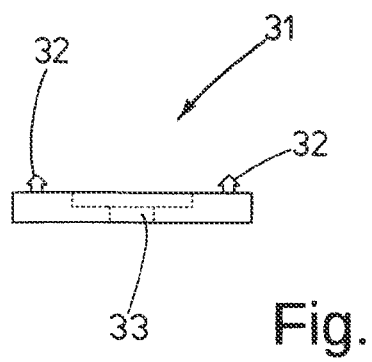
FIG. 11 shows a side view of the connecting means according to FIG. 10.

For applying the licence plate 10 to the vehicle, a number of bores 30 can be associated with the rear of the bottom part 21. Said bores 30 can be disposed according to a specified pattern or arbitrarily in the bottom part 21 (FIG. 9). By means of said bores 30, the licence plate 10 can be fastened to the vehicle by means of mounting aids 31. Said mounting aids 31 can be made rectangular or circular and can comprise one or more, or as shown in FIG. 10 four, anchoring means 32. The mounting aids 31 can be fastened by means of a centred perforation 33 to the body or a bumper of the vehicle. For example, a screw that is not represented through the perforation 33 can be tightened so that the mounting aid 31 is fixedly joined to the vehicle. The mounting aid 31 is fastened to the vehicle such that the anchoring means 32 can be joined to one of the bores 30. When the individual anchoring means 32 are inserted through the bores 30, an interlocking joint is made between the mounting aid 31 and the bottom part 21 of the licence plate body 11. Due to the use of a plurality of mounting aids 31, the licence plate 10 can thus be fastened on the vehicle in a simple and flexible manner at almost any position and so as to be at least substantially secure against attempts at manipulation.

It is moreover also conceivable that the licence plate 10 is fastened to the vehicle in a different way.

REFERENCE CHARACTER LIST 10 licence plate
11 licence plate body
12 inscription
13 country identifier
14 inscription field
15 data medium
16 antenna
17 slot structure
18 cavity
19 border
20 cover part
21 bottom part
22 reflex film
23 metallic coating
24 film
25 border
26 structure element
27 coating
28 arrow
29 arrow
30 bore
31 mounting aid
32 anchoring means
33 perforation

The invention claimed is:

1. A licence plate (10) for a vehicle with a licence plate body (11) comprising a front (20), a rear (21), at least one inscription field (14), and with at least one inscription (12) associated with the inscription field (14) of the licence plate body (11),
wherein a contactlessly readable data medium (15) and an antenna (16) are associated with the licence plate body (11),
wherein at least one cavity (18) is disposed in the licence plate body (11),
wherein a front of the licence plate body (11) or a coating (23) of the front (20) covering the cavity (18) comprises a slot structure (17) forming the antenna (16),
wherein the at least one cavity (18) is formed by a spacing between the front (20) and the rear (21) of the licence plate body (11), wherein the front (20) and the rear (21) have a common border (19), and
wherein the front (20) and an inner side of the rear (21) opposite the slot structure (17) in the cavity are retroreflective.

2. The licence plate (10) according to claim 1, wherein at least one of the front (20), the rear (21) and a border (25) is made of a transparent material.

3. The licence plate (10) according to claim 2, wherein the transparent material is a plastic.

4. The licence plate (10) according to claim 1, wherein the slot structure (17) is embodied as a straight slot that is oriented parallel to a lateral edge of the front (20) of the licence plate body (11).

5. The licence plate (10) according to claim 1, further comprising at least one distance element or structure element (26) disposed in the cavity (18) between the front (20) and the rear (21).

6. The licence plate (10) according to claim 1, wherein the front (20) and an inner side of the rear (21) opposite the slot structure (17) in the cavity (18) are coated with a retroreflective layer (27), wherein the retroreflective layer of the inner side is larger than the slot structure (17).

7. The licence plate (10) according to claim 1, wherein a retroreflective, self-adhesive, layer or film (24) with a demetallisation corresponding to the shape of the slot structure (17) or a corresponding slot-shaped aperture is applied to the front (20) of the licence plate body (11).

8. The licence plate (10) according to claim 1, wherein the inscription (12) is applied to a retroreflective layer on the front (20) of the licence plate body (11).

9. The licence plate (10) according to claim 1, wherein the data medium (15) produces a magnetic field and is coupled inductively and/or capacitively to the antenna (16), wherein the data medium (15) is disposed on or in the licence plate body (11) and is electrically isolated from the antenna (16).

10. The licence plate (10) according to claim 1, wherein the slot structure (17) comprises a perforation, wherein the data medium (15) is disposed in the perforation.

11. The licence plate (10) according to claim 10, wherein the data medium (15) is fixed in the perforation, and is covered by a coating or potted.

12. The licence plate (10) according to claim 1, further comprising mounting aids (31), in the form of bores or other receptacles, with which the licence plate body (11) is fastenable to the vehicle, are associated with the rear (21) of the licence plate body (11).

13. The licence plate (10) according to claim 1, wherein the slot structure (17) is positioned in a first or a second third on the front (20) measured from a longitudinal side of the licence plate body (11).

14. The licence plate (10) according to claim 10, wherein the perforation enlarges the slot in the vicinity of a closed end.

15. The licence plate (10) according to claim 1, wherein the slot structure (17) is made of a plurality of contiguous slots disposed orthogonally or parallel to each other.

16. The licence plate (10) according to claim 1, further comprising a plurality of distance elements or structure elements (26) that are oriented parallel to each other.

17. The licence plate (10) according to claim 1, wherein a self-adhesive layer or film (24) comprising the inscription (12) is applied to the front (20) of the licence plate body (11).

18. The licence plate (10) according to claim 1, wherein at least one of the front (20), the rear (21) and the border (25) is coated at least in some areas comprising the slot structure (17) with a metal coating (23).

19. The licence plate (10) according to claim 1, wherein at least one of the front (20), the rear (21) and the border (25) is made of a metallic material.

\* \* \* \* \*